(12) United States Patent
Herrmann

(10) Patent No.: US 10,945,502 B2
(45) Date of Patent: Mar. 16, 2021

(54) SELF-PROPELLING ITEM OF LUGGAGE AND METHOD FOR OPERATING A SELF-PROPELLING ITEM OF LUGGAGE

(71) Applicant: SMR Patents S.à.r.l., Luxembourg (LU)

(72) Inventor: Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/055,891

(22) Filed: Aug. 6, 2018

(65) Prior Publication Data

US 2019/0037994 A1 Feb. 7, 2019

(30) Foreign Application Priority Data

Aug. 7, 2017 (DE) .................... 10 2017 117 872.4

(51) Int. Cl.

| | |
|---|---|
| *A45C 15/00* | (2006.01) |
| *G05D 1/02* | (2020.01) |
| *A45C 5/14* | (2006.01) |
| *B62B 5/00* | (2006.01) |
| *A45C 5/03* | (2006.01) |
| *G05D 1/00* | (2006.01) |

(52) U.S. Cl.
CPC ............... *A45C 15/00* (2013.01); *A45C 5/14* (2013.01); *B62B 5/0033* (2013.01); *G05D 1/0234* (2013.01); *G05D 1/0251* (2013.01); *A45C 5/03* (2013.01); *B60B 2200/45* (2013.01); *B60W 2420/42* (2013.01); *B60W 2420/52* (2013.01); *G05D 1/0088* (2013.01); *G05D 2201/0211* (2013.01)

(58) Field of Classification Search
CPC .... A45C 15/00; B62B 5/0033; G05D 1/0251; G05D 1/0088; B60B 2200/45; B60W 2420/42; B60W 2420/52; G01G 19/00
USPC .......................................................... 701/25
See application file for complete search history.

(56) References Cited

U.S. PATENT DOCUMENTS

| | | | | |
|---|---|---|---|---|
| 2009/0030551 | A1* | 1/2009 | Hein | G05D 1/024 |
| | | | | 700/253 |
| 2013/0274987 | A1* | 10/2013 | Lee | G05D 1/0251 |
| | | | | 701/28 |
| 2017/0220040 | A1* | 8/2017 | London | G05D 1/0278 |
| 2018/0181137 | A1* | 6/2018 | Choi | G05D 1/0246 |
| 2018/0231983 | A1* | 8/2018 | Sangare | G05D 1/0246 |

(Continued)

FOREIGN PATENT DOCUMENTS

| | | | |
|---|---|---|---|
| CN | 2017/0220040 | 8/2016 | |
| WO | WO-2017206353 A1 * | 12/2017 | ............... A45C 5/00 |

*Primary Examiner* — Geepy Pe
*Assistant Examiner* — Tiffany P Ohman
(74) *Attorney, Agent, or Firm* — Jones Day

(57) ABSTRACT

A self-propelling item of luggage, for example a suitcase, includes at least a storage area, a drive, a camera, and a data processing device which is designed to recognize an authorized user in a predefined distance range by means of at least one image captured with the camera and on the basis of at least one visual feature extracted from the image, and to actuate the drive so that the item of luggage follows the authorized user in a self-propelling manner at a distance, where the at least one visual feature is characteristic of at least one item of clothing of the authorized user. A method for operating such a self-propelling item of luggage is also described.

6 Claims, 1 Drawing Sheet

(56) References Cited

U.S. PATENT DOCUMENTS

| | | | |
|---|---|---|---|
| 2018/0246512 A1* | 8/2018 | Martinson | G05D 1/0088 |
| 2019/0070601 A1* | 3/2019 | Wiederin | G01N 21/73 |
| 2019/0090601 A1* | 3/2019 | Ding | G05D 1/0214 |
| 2019/0142126 A1* | 5/2019 | Ying | G07C 9/00896 |

* cited by examiner

SELF-PROPELLING ITEM OF LUGGAGE AND METHOD FOR OPERATING A SELF-PROPELLING ITEM OF LUGGAGE

CROSS-REFERENCE TO RELATED APPLICATIONS

This application claims the benefit of foreign priority to German Patent Application No. DE 10 2017 117 872.4, filed Aug. 7, 2017, which is herein incorporated by reference in its entirety for all purposes.

BACKGROUND

1. Field of the Invention

The following description relates to a self-propelling item of luggage, for example, a suitcase. A method for operating such a self-propelling item of luggage is also described.

2. Related Art

In order to take the pressure off travelers it is desirable to equip items of luggage with a drive and an autonomous control system so that said items of luggage can independently follow the traveler.

An item of luggage of this type, which recognizes the position of the user on the basis of a transponder armband worn by the latter and which follows the latter at a predefined distance, is described by CN 106 527 494 A.

However, electronic components such as transponders are frequently uncomfortable to wear and are not aesthetically appealing. In addition, in the event of a defect or the loss of such a transponder armband, the self-propelling function of the item of luggage is lost so that said item of luggage then has to be carried or pulled again.

SUMMARY

A self-propelling item of luggage as well as a method for operating the same makes it possible to use the item of luggage conveniently and in a fail-safe manner.

In an aspect, a self-propelling item of luggage, such as a suitcase, includes at least a storage area, a drive, a camera and a data processing device which is designed to recognize an authorized user in a predefined distance range by means of at least one image captured with the camera and on the basis of at least one visual feature extracted from the image, and to actuate the drive so that the item of luggage follows the authorized user in a self-propelling manner at a distance, where the at least one visual feature is characteristic of at least one item of clothing of the authorized user.

Consequently, the fact that the authorized user is recognized purely visually means that there is no need to use electronic components such as transponders, thus making the utilization of the self-propelling item of luggage particularly convenient and reliable.

In this case, the term 'extracting of the visual feature' may refer to the production of machine-readable information from the at least one image, which describes whether and, if applicable, to what extent the respective visual feature is present in the relevant image. This can be carried out, for example, by image processing or image recognition methods. In this case, the visual feature can be recognized on the basis of the color and/or the form, for which pattern recognition or edge detection methods or the like can be applied.

The data processing device may be designed to identify the authorized user on the basis of a comparison with at least one predefined reference image of the authorized user, wherein the data processing device is preferably designed to store a plurality of predefined reference images or to read these from a memory, and to recognize the authorized user on the basis of at least one image from the plurality of predefined reference images.

As a result, the correct and simple recognition of the authorized user can be ensured. In this example, the visual feature which should later help to identify the authorized user is in particular first extracted from the reference image.

Different reference images of the user with various clothing may also be stored. This guarantees that, for example, discarding a jacket during warm weather does not make it necessary to reconfigure the self-propelling item of luggage. The self-propelling item of luggage can develop a database of reference images of its authorized user, which can be constantly updated beyond the period during which it is used, said database no longer requiring any further user inputs after a certain learning phase. Such an item of luggage is particularly user-friendly.

The item of luggage may include at least one authorization apparatus, by means of which an acquisition of the at least one predefined reference image can be authorized.

By using such an authorization apparatus, only the actual owner or a user authorized by him can use the item of luggage. Consequently, this prevents unauthorized persons programming the item of luggage to follow them.

The authorization apparatus may include a fingerprint scanner and/or an iris scanner and/or a code input apparatus and/or a lock and/or a magnetic card reader and/or a RFID reader.

This ensures that the identity of the authorized user can be reliably recognized.

The at least one visual feature may relate to the coloring of the clothing of the authorized user.

This makes possible a particularly simple recognition of the authorized user by the data processing device, which does not require any special measures for recognizing shapes or contours.

The at least one visual feature may indicate a size of the clothing and/or a proportion of the size of at least two items of clothing of the authorized user.

This makes it possible, for example, to distinguish the authorized user from another person who is wearing identically or similarly colored clothing, so that an incorrect recognition can be reliably excluded.

The at least one visual feature may relate to a recognition element worn by the authorized user.

Such a recognition element can, for example, be attached to the clothing of the authorized user and thus makes it possible to recognize the authorized user in a particularly secure manner, without the latter having to wear inconvenient or conspicuous accessories such as, for example, a transponder armband.

The recognition element may include a barcode.

Such a barcode may be particularly easy to identify for the data processing device and may additionally allow a reliable identification of the authorized user.

The self-propelling item of luggage may include at least one further sensor for recognizing obstacles.

The data detected by such a sensor can be utilized by the data processing device of the self-propelling item of luggage for route planning. This ensures that the self-propelling item of luggage does not collide with obstacles or passers-by when it is following the authorized user.

The at least one further sensor may be a camera and/or a radar sensor and/or a laser sensor and/or an ultrasonic sensor and/or an infrared sensor.

A reliable recognition of obstacles or passers-by can be guaranteed with the indicated sensors. The data captured by sensors of this type can, in addition, also be utilized in order to support or verify the identification of the authorized user.

The data processing device may be designed to output a warning to the authorized user in the event of the predefined distance interval not being observed. To this end, means for outputting a warning, in particular in conjunction with the data processing device and/or the further sensor, may be provided in order to output a warning to the authorized user in the event of the predefined distance range not being observed.

In this way, it can be ensured that the self-propelling item of luggage is not lost if it is not possible to follow the authorized user, for example because of obstacles in the way. The warning can, in the process, be provided for example acoustically by the item of luggage itself or can be transmitted to the user by communication of the item of luggage with a mobile unit such as, by way of example, a smartphone.

The storage area of the self-propelling item of luggage may be defined by an outer wall of the item of luggage and may be accessible via an opening mechanism, for example a zipper. In this case, it can also be provided that items of clothing inserted into the storage area are captured by a camera mounted there, in order to thus produce further reference images for recognizing the user, without the latter having to be active himself for this purpose.

In another aspect, a method for operating a self-propelling item of luggage includes capturing at least one image of an authorized user of the self-propelling item of luggage by means of at least one camera of the self-propelling item of luggage, extracting at least one visual feature from the image on the basis of which the authorized user can be recognized, and in response to recognizing the authorized user, actuating a drive of the self-propelling item of luggage so that said item of luggage follows the authorized user at a distance which lies in a predefined distance range, where the at least one visual feature is determined by at least one item of clothing of the authorized user.

The advantages described above also take effect here.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of systems, apparatuses, and methods consistent with the present description and, together with the description, serve to explain advantages and principles consistent with the invention.

DETAILED DESCRIPTION

Figure 1:
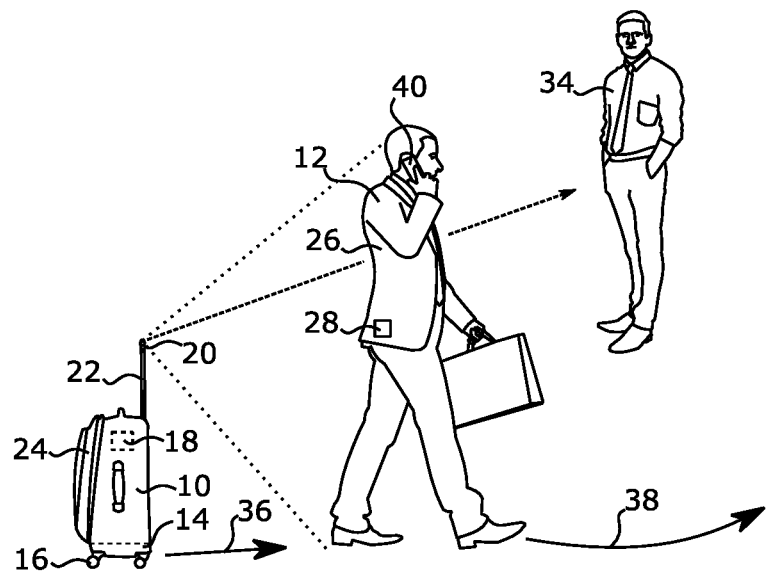
FIG. 1 shows a schematic representation of an example of a self-propelling item of luggage.
Figure 2:
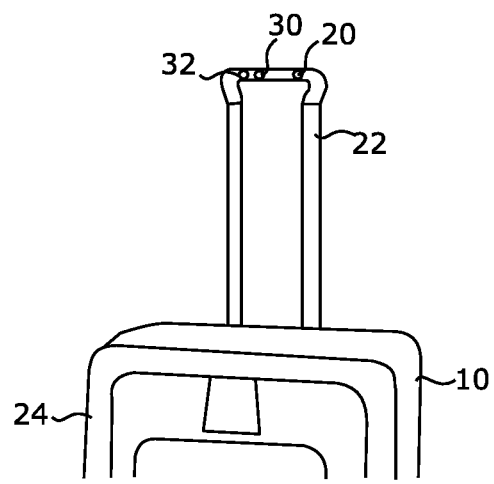
FIG. 2 shows a schematic detailed view of a sensor arrangement of an example of a self-propelling item of luggage.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

A self-propelling item of luggage 10, represented here in the form of a suitcase, is designed to follow an authorized user 12. To this end, the self-propelling item of luggage 10 has a drive 14 which can drive and steer wheels 16 of the self-propelling item of luggage 10. The drive 14 is controlled by a data processing device 18 which receives images from a camera 20. In the example shown, the camera 20 is arranged in a handle 22 of the self-propelling item of luggage 10; it can, however, also be mounted at any other locations, for example in a base body 24 of the self-propelling item of luggage 10.

The data processing device 18 extracts at least one item of information relating to a visual feature of the user 12 from the images received by the camera 20. This can be, for example, the coloring, a size of at least one or a proportion of two items of clothing 26 of the user 12. In order to make possible a particularly secure identification of the authorized user 12, an identification element 28 can also be affixed to an item of clothing 26, which can include, for example, a barcode. The information regarding the visual feature can, in this case, be extracted with various image or respectively pattern recognition methods.

In order to configure the self-propelling item of luggage 10, at least one reference image of the user 12 is first acquired with the camera 20. The acquisition of the reference image is, in this case, preferably triggered or respectively cleared by means of an authentication apparatus 30 which is likewise mounted on the handle 22 here. It can, for example, be a keyboard for inputting a code, an iris scanner, a fingerprint scanner, a lock, an input apparatus for a magnetic card or a RFID receiver. In this case, it is also possible for the data processing device 18 to store a plurality of reference images so that the user 12 can also be recognized with different items of clothing 26 or in order to authorize multiple users to use the self-propelling item of luggage 10.

The self-propelling item of luggage 10 additionally includes at least one further sensor 32 with which obstacles or passers-by 34 can be recognized. This can be, for example, a further camera, a radar sensor, a laser sensor, an ultrasonic sensor and/or an infrared sensor. In the example shown, the further sensor 32 is likewise arranged in the handle 22 of the self-propelling item of luggage. However, here as well, it is of course possible to mount the sensor 32 in the base body 24 of the self-propelling item of luggage 10.

The data processing device 18 determines a motion path 36 for the self-propelling item of luggage 10 from the position of the user 12 captured by means of the camera 20 and the position of possible obstacles captured by means of the sensor 30 which motion path follows a motion path 38 of the authorized user 12. The data processing device 18 then actuates the drive 14 accordingly so that the self-propelling item of luggage 10 remains within a predefined distance interval from the authorized user 12.

In the event that this is not possible due to obstacles in the path, the self-propelling item of luggage 10 can output a warning to the user 12. This can be effected, for example, by an acoustic signal of a signal generator mounted on the self-propelling item of luggage. It is also possible to transmit this information wirelessly to a handheld unit 40, for example a smartphone, of the authorized user. A warning can likewise be produced if the authorized user 12 leaves a detection range of the camera 20.

All in all, a self-propelling item of luggage 10 is created which is particularly convenient and safe to use.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS

10 Item of luggage
12 User
14 Drive
16 Wheels
18 Data processing device
20 Camera
22 Handle
24 Base body
26 Item of clothing
28 Identification element
30 Authentication apparatus
32 Sensor
34 Passer-by
36 Motion path
38 Motion path
40 Handheld unit

What is claimed is:

1. A self-propelling item of luggage, comprising:
at least one storage area;
a drive;
a camera;
a data processing device which is designed to recognize an authorized user in a predefined distance range using at least one image captured with the camera and based on at least one visual feature extracted from the at least one image, and to actuate the drive so that the self-propelling item of luggage follows the authorized user in a self-propelling manner at a distance,
at least one authorization apparatus through which an acquisition of the at least one predefined reference image can be authorized,
wherein the at least one visual feature is characteristic of at least one item of clothing of the authorized user,
at least one of the at least one visual feature is selected from a coloring of the at least one item of clothing of the authorized user, a size of the at least one item of clothing of the authorized user, or a proportion of at least two items of clothing of the authorized user, and the at least one visual feature comprises a code worn by the authorized user,
the data processing device is configured to identify the authorized user based on a comparison with the at least one predefined reference image of the authorized user,
the data processing device is configured to store a plurality of predefined reference images or to read the plurality of predefined reference images from a memory, and to recognize the authorized user based on the at least one predefined reference image from the plurality of predefined reference images, and
the at least one authorization apparatus comprises at least one of a fingerprint scanner, an iris scanner, a code input apparatus, a magnetic card reader, and an RFID reader.

2. The self-propelling item of luggage according to claim 1, wherein the code is a barcode on the at least one item of clothing.

3. The self-propelling item of luggage according to claim 1, further comprising another sensor for recognizing obstacles.

4. The self-propelling item of luggage according to claim 3, wherein the another sensor comprises at least one of a camera, a radar sensor, a laser sensor, an ultrasonic sensor, and an infrared sensor.

5. A method for operating a self-propelling item of luggage, comprising:
providing the self-propelling item of luggage of claim 1;
capturing at least one image of the authorized user of the self-propelling item of luggage using the camera of the self-propelling item of luggage;
extracting at least one visual feature from the at least one image based on which the authorized user can be recognized; and
actuating the drive of the self-propelling item of luggage so that the self-propelling item of luggage follows the authorized user at a distance which lies in a predefined distance range in response to recognizing the authorized user,
wherein the at least one visual feature is determined by at least one item of clothing of the authorized user, and
at least one of the at least one visual feature is selected from a coloring of the at least one item of clothing of the authorized user, a size of the at least one item of clothing of the authorized user, or a proportion of at least two items of clothing of the authorized user, and the at least one visual feature comprises a code worn by the authorized user.

6. A self-propelling item of luggage, comprising:
at least one storage area;
a drive;
a camera;
a data processing device which is designed to recognize an authorized user in a predefined distance range using at least one image captured with the camera and based on at least one visual feature extracted from the at least one image, and to actuate the drive so that the self-propelling item of luggage follows the authorized user in a self-propelling manner at a distance; and
another sensor for recognizing obstacles, the another sensor comprising at least one of a radar sensor and an infrared sensor,
wherein the at least one visual feature is characteristic of at least one item of clothing of the authorized user, and
at least one of the at least one visual feature is selected from a coloring of the at least one item of clothing of the authorized user, a size of the at least one item of clothing of the authorized user, or a proportion of at least two items of clothing of the authorized user, and the at least one visual feature comprises a code worn by the authorized user.

* * * * *